(12) United States Patent
Breda (10) Patent No.: US 10,274,111 B2
(45) Date of Patent: Apr. 30, 2019

(54) PIPE HOLDER AND GUIDE

(71) Applicant: JVD Holdings Inc., Maple (CA)

(72) Inventor: Victor A. Breda, Maple (CA)

(73) Assignee: JVD Holdings Inc., Maple, Ontario (CA)

(*) Notice: Subject to any disclaimer, the term of this patent is extended or adjusted under 35 U.S.C. 154(b) by 0 days.

(21) Appl. No.: 15/343,840

(22) Filed: Nov. 4, 2016

(65) Prior Publication Data

US 2017/0204996 A1    Jul. 20, 2017

(51) Int. Cl.
| | |
|---|---|
| *F16L 3/08* | (2006.01) |
| *F16L 3/223* | (2006.01) |
| *F16L 3/10* | (2006.01) |
| *F16L 3/22* | (2006.01) |
| *H02G 3/32* | (2006.01) |
| *F16L 3/06* | (2006.01) |

(52) U.S. Cl.
CPC ............. *F16L 3/223* (2013.01); *F16L 3/1025* (2013.01); *F16L 3/22* (2013.01); *H02G 3/32* (2013.01); *F16L 3/06* (2013.01)

(58) Field of Classification Search
CPC ................ F16L 3/10; F16L 3/223; F16L 3/13
See application file for complete search history.

(56) References Cited

U.S. PATENT DOCUMENTS

| | | | | | |
|---|---|---|---|---|---|
| 3,216,025 | A | * | 11/1965 | Roll | E03C 1/01 248/67 |
| 3,385,545 | A | * | 5/1968 | Patton | F16L 3/222 248/228.5 |
| 6,061,880 | A | * | 5/2000 | Senninger | E03C 1/021 24/335 |
| 7,339,119 | B2 | * | 3/2008 | Hamazu | H02G 3/0666 174/356 |

FOREIGN PATENT DOCUMENTS

CA          2229469       11/2005

* cited by examiner

*Primary Examiner* — Amy J. Sterling
(74) *Attorney, Agent, or Firm* — Frost Brown Todd LLC (57) ABSTRACT

A pipe, hose and wiring holder and support is provided which is made of a rigid body, itself made of a primary ring of a diameter adapted to fit around a first pipe (or hose or wiring), and one or more secondary rings attached to the primary ring by arms, each secondary ring of a size to fit around secondary pipes (or hoses or wiring), with all rings lying in the same plane and being laterally disposed from one another, and where fitting the pipe holder to the primary and secondary pipe or pipes serves to stabilize, support, and position the set of pipes, hoses or wires relative to one another.

19 Claims, 10 Drawing Sheets

PIPE HOLDER AND GUIDE

FIELD OF THE INVENTION

This invention relates in general to pipe, hose and wiring holders and supports. More particularly, the present invention relates to pre-fabricated pipe, hose and wiring holders and support apparatus to hold, support, and guide pipes, hose, wiring, and the like, including those used in construction of high rise and low rise buildings and homes.

BACKGROUND OF THE INVENTION

In present construction of buildings, pipes, hoses, wiring, and vents are often used throughout the home to hold or transport materials or fluids, including water and sewage, to desired locations in the building. In the case of conventional piping systems, they are often constructed from metal (including cast iron and copper) acrylonitrile butadiene styrene (ABS), polyvinylchloride (PVC) piping, or cross-linked polyethylene (PEX), for instance. Unfortunately, however, these pipes are generally affixed in a haphazard manner to the framing structure of the building using current construction methods. For example, in residential home construction, the pipes are often simply affixed to the nearest piece of building frame, using manually cut pieces of wood, timber, steel rods, or plates in order to bridge the gap between the location of the pipe and the nearest piece of framing to which the pipe can be affixed. In high rise construction, the pipes are affixed to structural members using metal bridging which is specifically cut and purchased for pipe support.

However, because of the lack of structure or arrangement in how the pipes are attached to the building frame or building structure, and the fact that pipes need to be positioned in particular locations throughout the building for proper transport of the fluids, undesirable complications or situations often arise. For example, pipes that are required to be run vertically may not be positioned near a vertical structural member of the frame of the building along which it can be run. As a result, to support the vertically running pipe, additional structural members will need to be fabricated or cut in order to attach and brace the vertical pipe to the nearest structural member. This fabrication requires additional materials, time for fabrication or cutting of these additional structural members, and occupies the time of tradespeople who could otherwise be doing other work, thereby saving construction costs.

Furthermore, some piping is most effective when positioned in association with other pipes. For example, the hot, cold and drain pipes of a typical pedestal or lavatory sink are intended to be aligned in a particular fashion, and oriented and arranged with respect to each other in a particular arrangement. These three pipes are often run vertically along or parallel to the frame of the house. When they reach their destination where the lavatory sink is to be located, these three pipes often bend ninety degrees from the vertical to run perpendicular (to the floor) and pass horizontally through the drywall underneath the sink and under the pedestal before being connected to the hot, cold, and drain connections of the faucet and sink bowl, respectively.

The particular arrangement of these three pipes, with the hot and cold pipes above and to the left and right, respectively, of the drain pipe, is often difficult to achieve with three individual pipes. Each pipe has to be manually spaced as it passes horizontally through the wall to end up under the pedestal of the sink, and it is very typical for the three pipes to pass through the drywall in an uneven or asymmetrical manner. This can then lead to problems hooking the pipes to the sink faucet, and the installation being unsightly, especially where the pedestal sink is not a closed one and the piping is visible.

Certain manners of positioning and supporting piping during storage and transport are known, including as disclosed in, for example, Canadian patent number 2229469 entitled "Apparatus for Supporting Pipes" invented by Volkrad Schneider, which discloses a supporting device that can be cost effectively manufactured, that is light, and that can be used universally for positioning stored and transported piping. However, this disclosure supports pipe segments during transport or storage only, and is not intended to have any role in supporting or affixing pipes to building frames when those pipes are in use.

There is thus a need for an apparatus that can hold or support pipes easily, quickly, and while overcoming the disadvantages described above.

To overcome the aforementioned disadvantages it would be desirable to have an apparatus to help arrange and support piping, hoses, wiring, or vents that are run through buildings, including new build high rises and low rise residential housing. Such an apparatus should preferably be easy and inexpensive to fabricate, inexpensive to the end user, simple to use for the tradespeople and homeowners who will use them, and adjustable.

SUMMARY OF THE INVENTION

In accordance with one embodiment of the present invention, there is provided a holder and support apparatus to hold, support, and guide pipes, hose, wiring, and the like, including those used in construction of high rise and low rise buildings and homes.

In particular, the present invention provides a rigid body that is integrally comprised of a primary ring that is designed to fit around a first pipe, one or more secondary rings that are connected to the primary ring by one or more arms, with each secondary ring being a diameter adapted to fit around a secondary pipe, with the primary and one or more secondary rings lie in the same plane and are laterally disposed from one another, and wherein fitting the rings around their respective pipes serves to stabilize, support, and position the pipes in relation to one another.

The pipe holder may be fabricated from a number of materials, but advantageously is fabricated of metal, wood, polyoxymethylene, polyvinyl chloride (PVC), chlorinated polyvinyl chloride (CPVC), or acrylonitrile butadiene styrene (ABS).

The pipe holder of the invention may be fabricated such that the primary or secondary rings are fabricated in two semi-circular portions, wherein the corresponding ends of the two semi-circular portions match and engage, so as to connect around a pipe. This allows the pipe holder to be fit around piping which has already been installed in a building. The engagement means can be any suitable engagement means known to a person of skill in the art, but include slot and groove and dove tail notice and groove attachments.

The pipe holder of the present invention may have secondary rings with inner diameters between 0.25" and 3.5", suitable for engaging water supply pipes. Preferably these inner diameters can be between 0.5" to 1.3" to fit the size of pipe being used, and more preferably 1.14" to 1.16", which are suitable sizes for the secondary rings to engage water supply pipes with 1" inner diameter (and 1.15" outer diameter) which are common in the industry. Most preferably the secondary rings have inner diameters of about 1.15", 0.65" or 0.90" which will fit the most common water supply pipe sizes.

The pipe holder of the present invention has a primary ring with inner diameter of between 1" and 11" for engagement around a range of pipes, but preferably has an inner diameter of between 1.55" and 4" for engagement around common sizes of drain pipes, and more preferably 1.86 to 1.94". The primary ring most preferably has inner diameters of about 1.92" to engage a 1.5" water drain pipe (inner diameter), about 2.4" to engage a 2" water drain pipe, and about 2.9" to engage a 3" water drain pipe. It is known that slight variations in these measurements may be allowed or required to fit variations in pipe size, which has been referred by the use of the term "about" in the claims.

The pipe holder of the present invention is preferably fabricated with two secondary rings, designed to fit two water supply pipes, and the two secondary rings and the primary ring are preferably laid out in a "V" shape, with the two secondary rings disposed laterally outwards and upwards of the primary ring but in the same plane.

The pipe holder of the present invention may also be fabricated wherein the primary ring and two secondary rings are located along a line extending outwards from the centre of the primary ring. The primary ring can be located at one end of the body of the pipe holder, or between the two secondary rings, as needed.

The pipe holder of the present invention may also be fabricated for specific use with a female hub end of a drain pipe and two supply pipes. In this embodiment, the primary ring has an inner diameter of approximately 2" to 2.5", or more preferably 2.25", for fitting around the female hub end of a drain pipe. In this embodiment, the secondary rings have inner diameters of approximately 0.6" to 0.8", or more preferably 0.669", for adaptation around water supply pipes. The vertical distance between the center point of each of the two secondary rings and the primary ring is between 2" and 3" and the horizontal distance from the centre point of each of the two secondary rings to the centre point of the primary ring is between 4" to 6". More preferably, the vertical distance between the center point of each of the two secondary rings and that of the primary ring is 2.5", and the horizontal distance from the centre point of each of the two secondary rings to the centre point of the primary ring is 4.5". The angle formed by the two lines connecting the midpoint of the primary ring and the midpoint of each of the two secondary rings is 50 to 70 degrees. More preferably, the angle formed by the two lines connecting the midpoint of the primary ring and the midpoint of each of the two secondary rings is 55 to 65 degrees. More preferably, the angle formed by the two lines connecting the midpoint of the primary ring and the midpoint of each of the two secondary rings is 60.95 degrees.

BRIEF DESCRIPTION OF THE DRAWINGS

In the detailed description which follows, reference will be made to the following drawings which illustrate embodiments of the present invention and, together with the description, serve to explain the principles and advantages of the present invention.

DETAILED DESCRIPTION OF THE INVENTION

A detailed description of various illustrative embodiments and possible implementations of the present invention will now be provided. It should be appreciated that the present invention provides many applicable inventive concepts that can be embodied in a wide variety of specific contexts, and that the embodiments described are purely exemplary and do not limit the scope of the present invention. The invention extends to alternatives, modifications, and equivalents to each of its elements, all of which are included in the scope of the invention.

The invention being described is a pre-fabricated pipe holder designed to fit over a drain pipe and that supports one or more, and preferably two, related water feed line pipes to the drain pipe, rendering the collection of pipes more rigid and obviating the need to individually attach these pipes to studs with individually cut pieces of wood or other material.

In addition to piping, and while the terms "pipe", "pipe holder", "first pipe", and "second pipe" are used in the description and claims herein, the present invention can be adapted to fit other building conduits, including particularly hoses and vents, according to the same principles by which it is described to be used in accordance with piping, and with the present invention providing the same advantages in relation to other types of conduits as it does for pipes.

Figure 1:
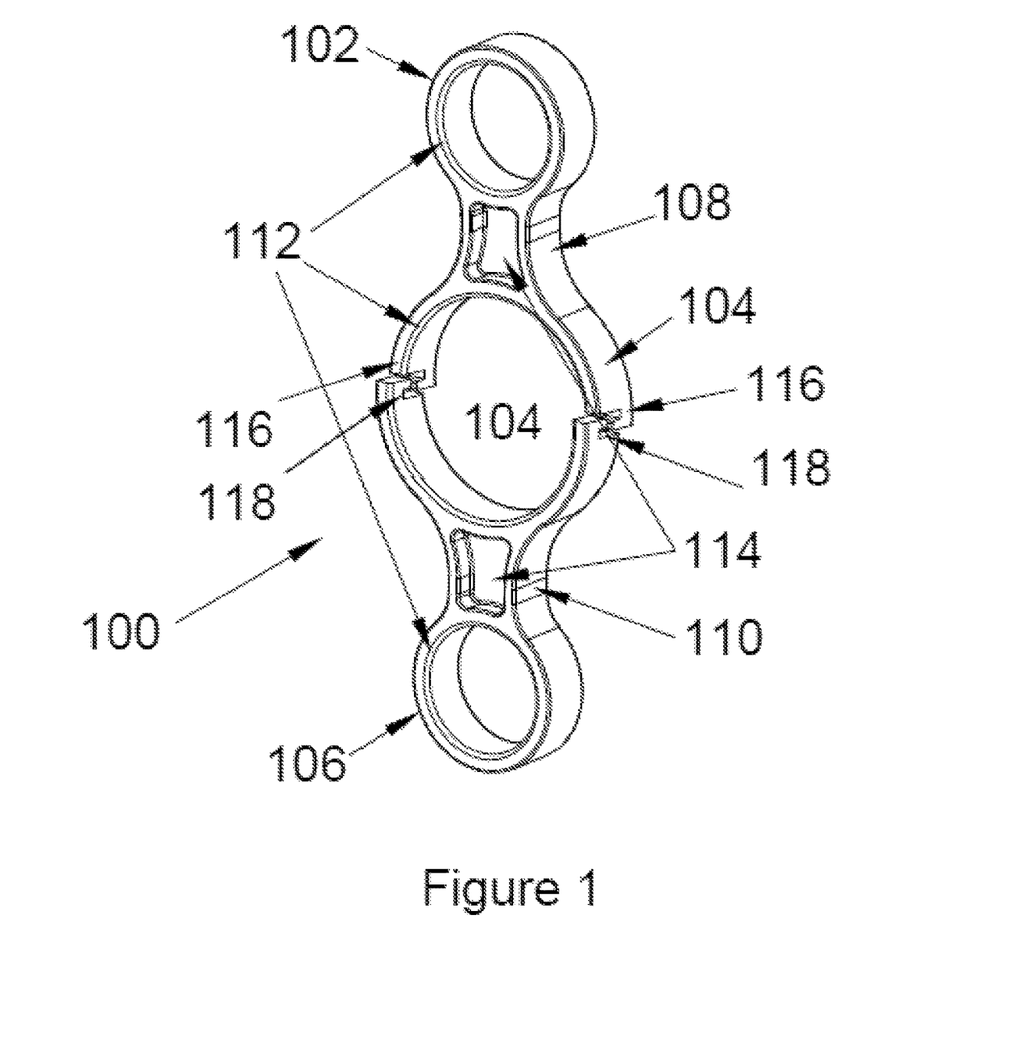
FIG. 1 is a perspective view of an embodiment of the supporting apparatus according to the present invention, designed to support two water lines by connection to a third pipe.
Figure 2:
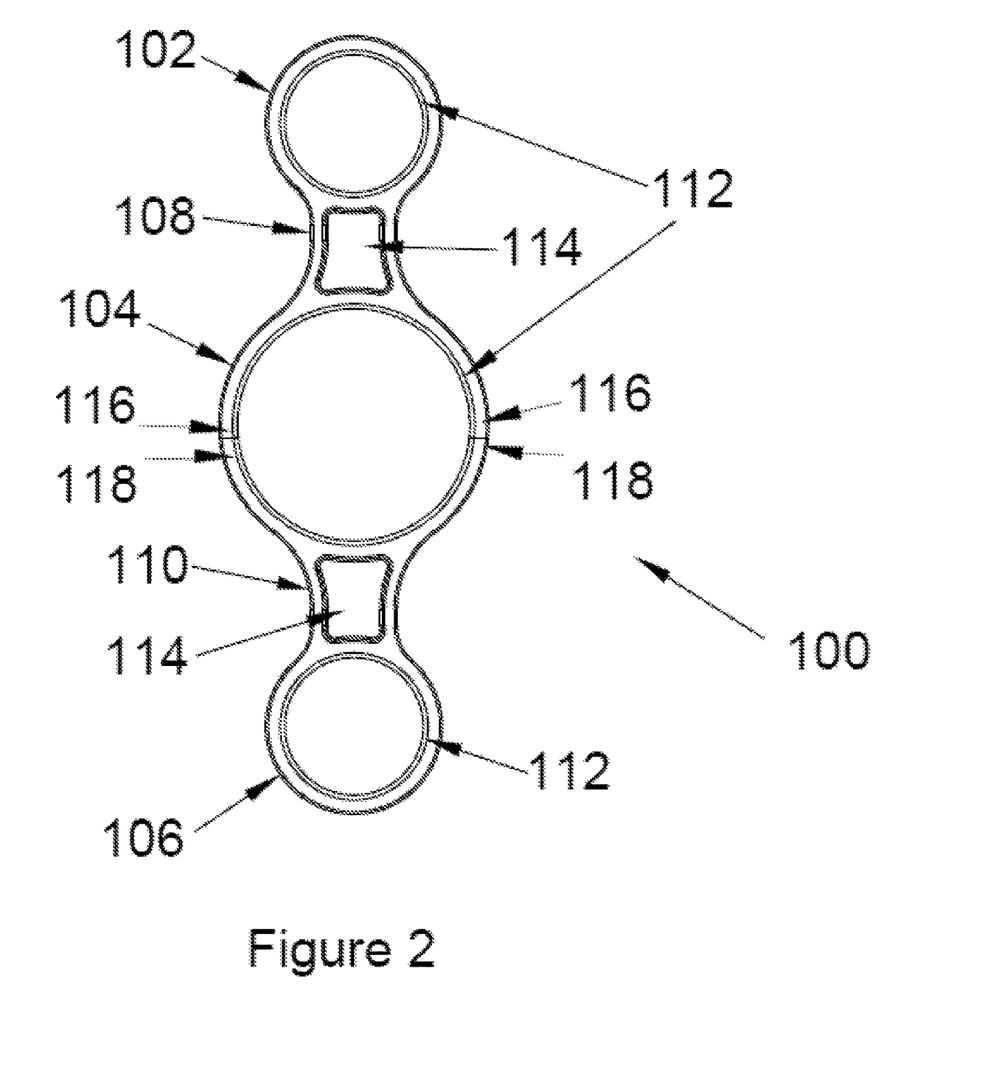
FIG. 2 is a front view of the supporting apparatus of FIG. 1.

Referring to FIGS. 1 and 2, a pipe holder 100 is shown in an embodiment of the present invention which comprises a primary ring 104, and two secondary rings 102 and 106 lying in the same plane. Referring to FIG. 1, secondary rings 102 and 106 are located on either side of primary ring 104, although this particular configuration is not necessary to the support function and the rings can be arranged in any suitable configuration with respect to each other as is thought desirable, as will be seen in later Figures.

Each of primary ring 104 and secondary rings 102 and 106 are fabricated with inner diameters designed to receive the size of pipe to be fit into each ring, and therefore can be adjusted to suit the particular application to which the pipe holder 100 will be used. Furthermore, regardless of the size of pipe to be held by primary ring 104 and secondary rings 102 and 106, it is preferable for the inner diameter of each ring to be fabricated slightly larger than that required to receive the outer diameter of the pipe to be held by each ring. This allows the primary ring 104 and secondary rings 102 and 106 to fit in a sufficiently snug manner around the pipes to be held and supported, yet also allows the pipe holder to be moved longitudinally along the pipe for accurate positioning as needed or desired.

In FIG. 1, primary ring 104 is shown in a size to fit around a 1.5" drain pipe, whereas secondary rings 102 and 106 are shown in sizes that would accommodate 0.5" PEX piping, as is commonly used in many countries for hot and cold water supply pipes. However, it would be apparent to a person skilled in the art that these sizes are not limiting and may be adjusted to fit virtually any size pipe to accommodate construction needs.

It is understood that pipe size in the art refers to the interior diameter of the pipe in question. Therefore a 1.5" pipe would have an interior diameter of 1.5", and an exterior diameter equal to this interior diameter plus the thickness of the pipe's two walls. So, for example, a 1.5" drain pipe may have walls approximately 0.20" thick, and therefore have an exterior diameter of 1.90".

It is also understood that a ring designed to fit piping of a given size would have a slightly larger interior diameter than that of the outer diameter of the pipe to be fit. So, as an example, to fit a 1.5" pipe, which has an exterior diameter of 1.9", one might construct the corresponding ring with an inner diameter of 1.92" so as to allow the ring to fit over the pipe with a slight gap to allow lateral movement, and yet be securely attached to the pipe when properly affixed, as discussed herein.

In particular, the present invention may be suitably fabricated by scaling the diameter of the primary ring 104 and secondary rings 102 and 106 so as to fit any size water line as desired. Particularly useful embodiments of the primary ring are those designed to fit drain pipes of any size, but particularly in sizes of between 1" to 11" (inner diameter), and with commonly used sizes of piping being 1.5", 2" and 3" drain pipe. As these piping sizes refer to inner diameters, these sizes of pipe have exterior diameters of about 1.9", 2.4" and 3.4" respectively. Primary rings designed to fit these pipes might have inner diameters of very slightly larger than these diameters, so as to be able to be fit over these piping sizes. So, for example, primary ring 104 designed to fit the above sizes would preferably be fabricated with inner diameters of 1.90", 2.40" and 3.40", wherein these measurements can vary by up to, in the case of the numbers just described, plus or minus 0.05" of each of these amounts, which is referred to in the claim by the term "about".

Particularly useful embodiments of secondary ring 102 and 106 are those which are designed to fit PEX A water line pipes of 0.5", 0.75" or 1" diameters; PEX B water line pipes of 0.5", 0.75" or 1" diameters; or copper type M water line pipes in 0.5" inch, 0.75" or 1" diameters. As described earlier, these measurements are inner diameters, and common external diameters of these pipes are about 0.65", 0.90" and 1.15", respectively. For this reason, secondary rings designed to fit these pipes might have inner diameters of very slightly larger than these diameters, so as to be able to be fit over these piping sizes.

Rings 102, 104 and 106 are connected in FIG. 1 by two arms 108 and 110 which connect, in this embodiment, ring 102 to ring 104 and ring 104 to ring 106, respectively. A preferred embodiment of pipe holder 100 is one in which the three rings 102, 104 and 106 are connected by arms 108 and 110 integrally formed in some manner with ring 104 and which may therefore be part of the same fabricated or injected molded entity 100, as shown in FIG. 1, as opposed to arms 108 and 110 being separate pieces that can be connected to rings 102, 104 and 106 (although such an embodiment is still covered by the present invention).

Pipe holder 100 can be fabricated out of many materials, including metal, wood, PVC, and the like. However, pipe holder 100 is preferably fabricated from plastic, and more preferably from ABS, PVC plastic, or cross-linked polyethylene (PEX), and most preferably from ABS plastic. Use of these plastics, as opposed to other materials, allows for inexpensive fabrication of pipe holder 100, creating a light end product, while maintaining sufficient strength suitable for its application. Furthermore, fabricating the pipe holder 100 of the present invention out of plastic allows for pipe holder 100 to be injection molded, further saving costs. In particular, it is advantageous to use the same type of plastic for the present invention as the type of plastic being used in the construction. Thus, when ABS piping is used in the building, the preferred embodiment of the present invention is comprised of ABS plastic, which allows the apparatus of the present invention to be permanently affixed to the pipes in use in the construction with the same pipe cement being used for the project.

Pipe holder 100 is also shown in FIGS. 1 and 2 with optional cut-outs 114 in each of arms 108 and 110. These serve to reduce the amount of material required to form the pipe holder 100, and thereby reduce its weight and cost, while not reducing the torsional rigidity of the pipe holder 100. Alternatively, cut-outs 114 may be cut entirely through the body of pipe holder 100 and used a passageways through which wiring and the like may be maintained.

The pipe holder 100 may be fabricated as wide as desired (referring to the width or thickness of the pipe holder 100 when viewed from a side elevation view), balancing the amount of required support for the pipe with the thickness of materials and resulting fabrication cost. However, a preferred thickness which serves as a good balance between manufacturing and materials cost of fabricating the pipe holder 100, and sufficiently holding the pipes to be fitted therein, is half an inch.

Each of primary ring 104 and secondary rings 102 and 106 have interior surfaces that engage the pipes, and are preferably fabricated such that the interior edges 112 thereof are chamfered; that is, the diameter of the interior surfaces are slightly larger at their edges 112 than at their centres by virtue of an angled edge as is shown in FIG. 1. This slight angling of edges 112 allows rings 102, 104 and 106 to more easily fit over the ends of the pipes being fit.

In use, as a building is being built and particularly as the water piping is being installed, one would periodically fit pipe holder 100, such as shown in FIG. 1, over the main drain pipe being run and two associated water supply pipes. Using the embodiment in FIG. 1 as an example, if one were running a drain pipe, a hot water supply pipe, and a cold water supply pipe, one would periodically affix pipe holder 100 over these three pipes as the pipes were being run through the frame of the house. The main drain pipe would be fit through the centre of primary ring 104. The hot water pipe would be fed through secondary ring 102, and the cold water feed pipe would be fed through secondary ring 106.

These pipes would normally, absent the invention, have to be anchored to the building frame as the piping was run vertically or horizontally within the building framing. This requires some kind of anchoring means, which in most existing cases is fabricated by cutting pieces of wood to be fitted on one end of the pipe and then anchored to pieces of the building frame, so as to anchor the pipe to the rigid frame of the building. This needs some kind of material, often wood, to connect the piping to the framing, and takes construction trade time and effort in measuring, cutting and affixing these connectors to the building frame and to the pipes. Alternately there are available metal supports or bridging units that can be used, but these are expensive and complicated to attach to the pipes and to the framing members of the building, particularly because the sizing of these metal supports or bridging units can vary.

Using the invention, however, piping can be run in such a fashion that it serves to brace the pipes around which it is fastened to each other, as the invention positions and supports each pipe to the other two pipes. The combination of three pipes in this self-supporting fashion renders the collection of pipes much more rigid than they would be if independently run around the frame of the building and individually affixed to either framing members of the building being constructed, or to each other. The pre-fabricated nature of the invention also allows for quick and easy affixing of the pipe holder 100 to these pipes. Even if the piping still requires connection to the building frame, which can be accomplished in the traditional manner: by anchoring one of the pipes to the nearest portion of building frame—it will require this attachment less often than without the present invention. Furthermore, piping run using the present invention makes for a neater and more tidy pipe installation, which can help in ensuring proper water flow.

As noted earlier, as pipe is run throughout a building being constructed, one would periodically affix to the three pipes a pipe holder as in the embodiment shown in FIG. 1. It would be fit over the ends of the three pipes as previously described such that each of the pipes is fit through one of the primary or two secondary rings. Alternatively, ring 104 can be placed around a pipe via cut-outs 116 and 118 which allow for separation of the ring and are thus designed to releasably engage and lock around a pipe. In a further alternative, rings 102 and 106 can be designed with similar cut-outs to allow each ring to releasably engage and lock around each of their corresponding pipes. The entire pipe holder 100 can then be slid longitudinally along the lengthwise axis of the pipes to whatever location requires the most strengthening and where the piping requires the most support. Once the invention has been placed where desired, glue is used to permanently affix the pipe holder to the pipes. This has the extra advantage of affixing the pipe holder 100 to the pipes such that rattle of piping is reduced when the pipes are in use.

The glue to be used can be selected according to the composition of the pipe and the pipe holder 100. As noted earlier, it is preferable that pipe holder 100 is fabricated from plastic, and in particular ABS or PVC plastic. When ABS pipe is used, it is preferable that the pipe holder 100 be made of ABS as well. On the other hand, if PVC piping is being used, it is preferable that the pipe holder 100 be made of PVC. As noted, this allows the plastic cement being used for the construction work in connection with the ABS or PVC piping to also be used to affix the pipe holder 100 to the pipe in question, although it is known in the art that there are transition glues that allow PVC to be affixed to ABS, and vice versa.

As noted above, each of the primary ring 104 or secondary rings 102 and 106 can be optionally but preferably split such that the pipe holder 100 can have that particular ring placed around a pipe and then the two halves of the ring joined to reform the original shape of the pipe holder 100 around the pipe. So, for example, in FIG. 1 the pipe holder 100 is fabricated in two pieces with primary ring 104 split at its midpoint. The edges of primary ring 104 where the split is located are fabricated, in this embodiment, with corresponding and matching edges—in this case with tabs and cut-outs 116 and 118 which are matching and co-engaging—that are designed to slide into one another and provide support for the pipe holder 100 when connected as one piece. Another manner of creating such connectivity is by dove-tailed notch on one piece of the ring, and corresponding groove on the other piece of the ring. They also serve as a location within which to place plastic cement and/or glue and increase the surface area of adhesion between the two portions of the ring being joined.

Figure 7:
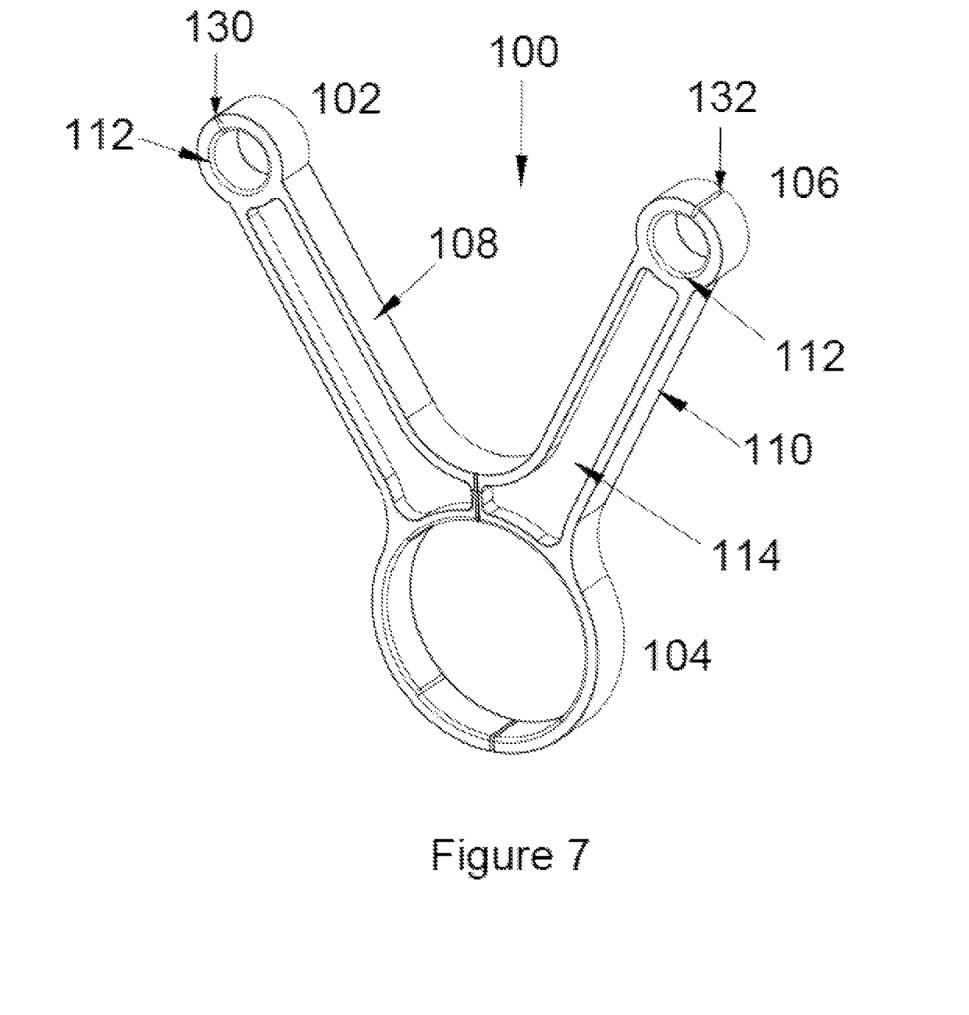
FIG. 7 is a perspective view of an embodiment of the supporting apparatus according to the present invention, designed to hold two water pipes in a V-shaped configuration with respect to a drain pipe hub.

Furthermore, each of primary ring 104 and secondary rings 102 and 106 can also be fabricated with a notch allowing for slight flex to the ring, in case the diameter of pipe to be fitted within the ring is not exactly as anticipated. FIG. 7 shows an embodiment of the present invention containing this feature as notches 130 in secondary ring 102, notch 132 in secondary ring 106, and notch 134 in primary ring 104. Preferably, secondary rings 102 and 106 are notched in most applications of the embodiments of the present invention, to adjust for variances in the diameter of the water line pipes.

Figure 3:
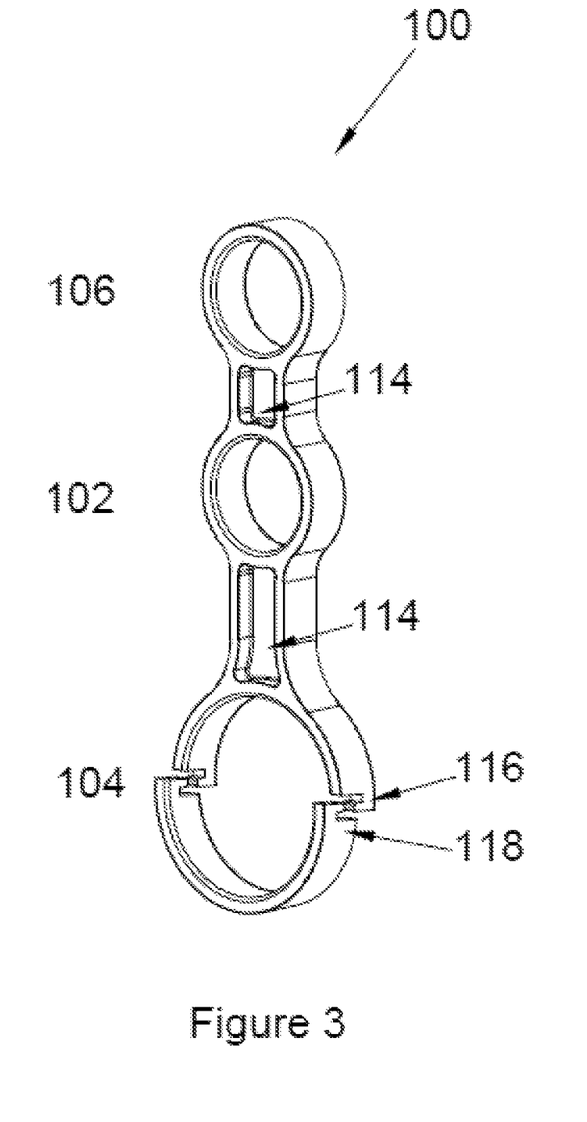
FIG. 3 is a perspective view of an embodiment of the supporting apparatus according to the present invention, designed to support two water pipes in series to a third pipe.
Figure 4:
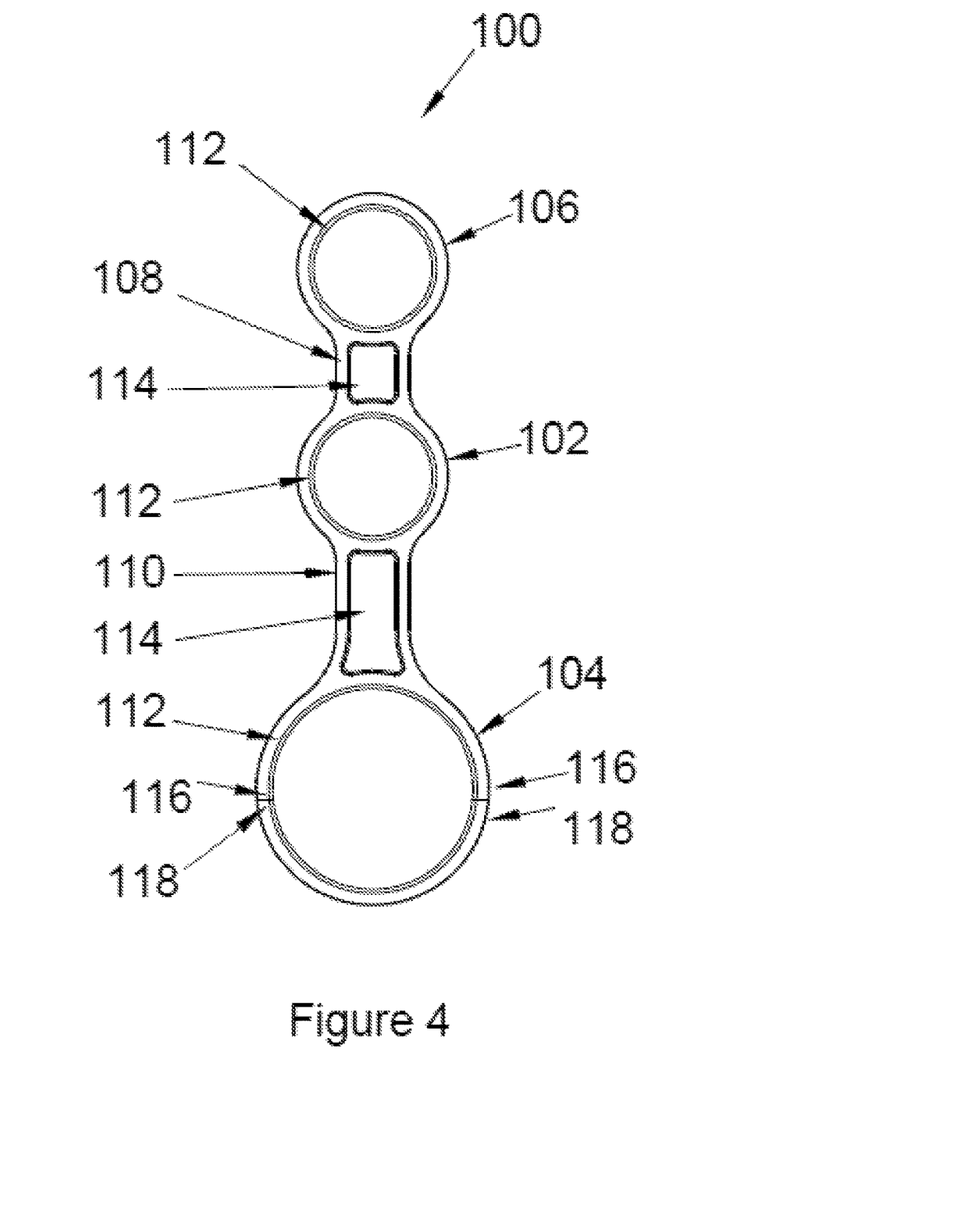
FIG. 4 is a front view of the supporting apparatus of FIG. 3.

Referring to FIGS. 3 and 4, an embodiment of the present invention is shown in which the primary ring 104 is located not in the centre of pipe holder 100, but at one end. This embodiment would be suitable for situations in which there is not sufficient room for the smaller pipes to be placed on either side of the larger pipe. For example, this may be appropriate in situations in which the larger pipe must be run along a portion of frame in the building and there is not sufficient room on both sides of it to place the smaller piping.

Figure 5:
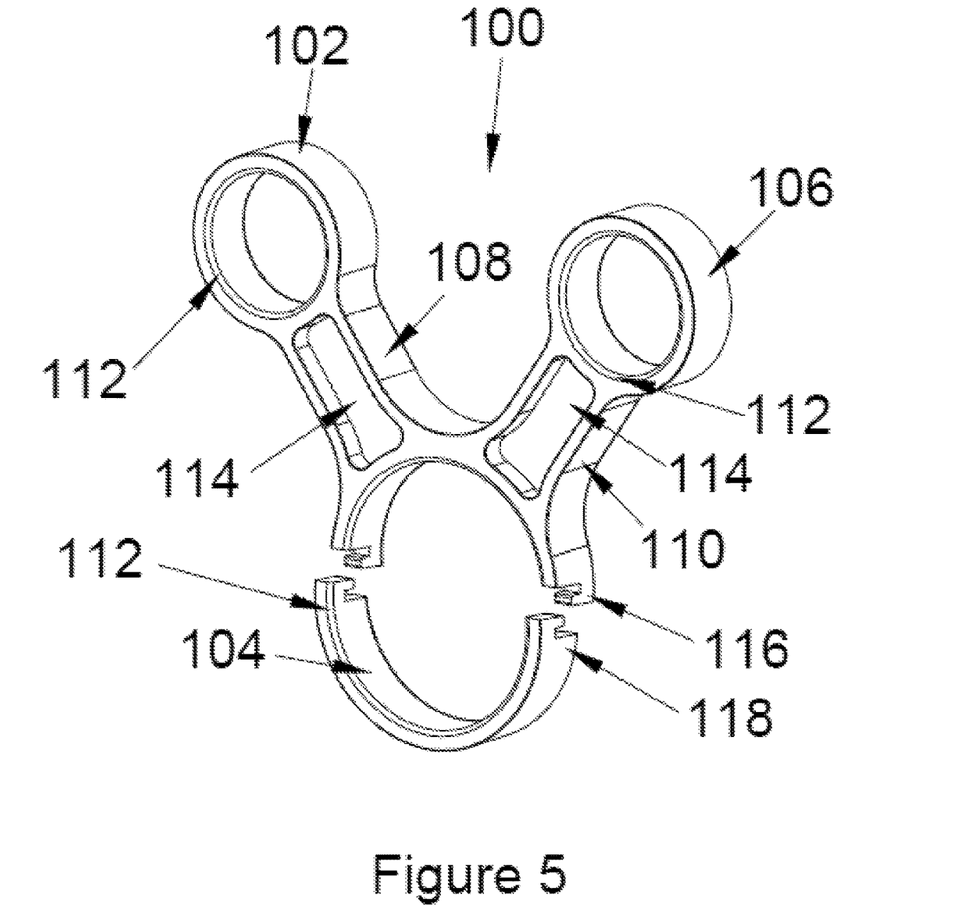
FIG. 5 is a perspective view of an embodiment of the supporting apparatus according to the present invention, designed to hold two water pipes in a V-configuration with respect to a third pipe.
Figure 6:
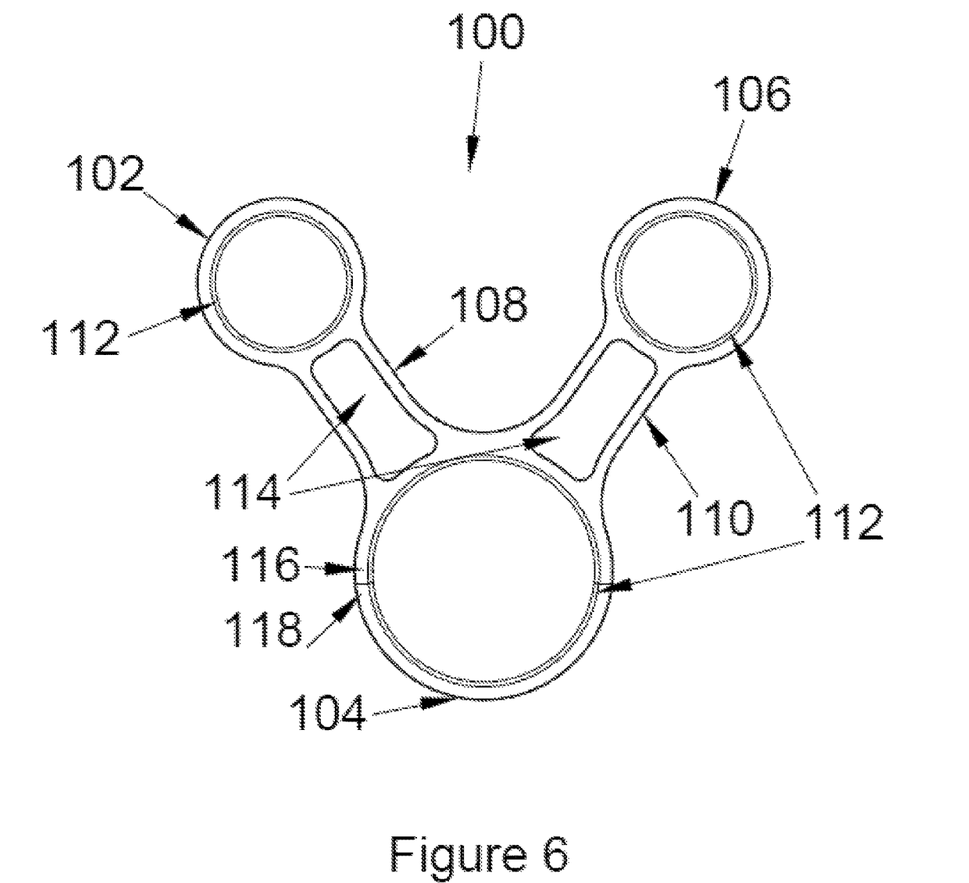
FIG. 6 is a front view of the supporting apparatus of FIG. 5.

Referring to FIGS. 5 and 6, an embodiment of the present invention is shown in which the first pipe holder ring 104 and the two secondary pipe holder rings 102 and 106 form a V-shape with the first pipe holder ring 104 in the centre, and the two secondary pipe holder rings 102 and 106 lying to either side and vertically offset from the first pipe holder ring 104.

Figure 8:
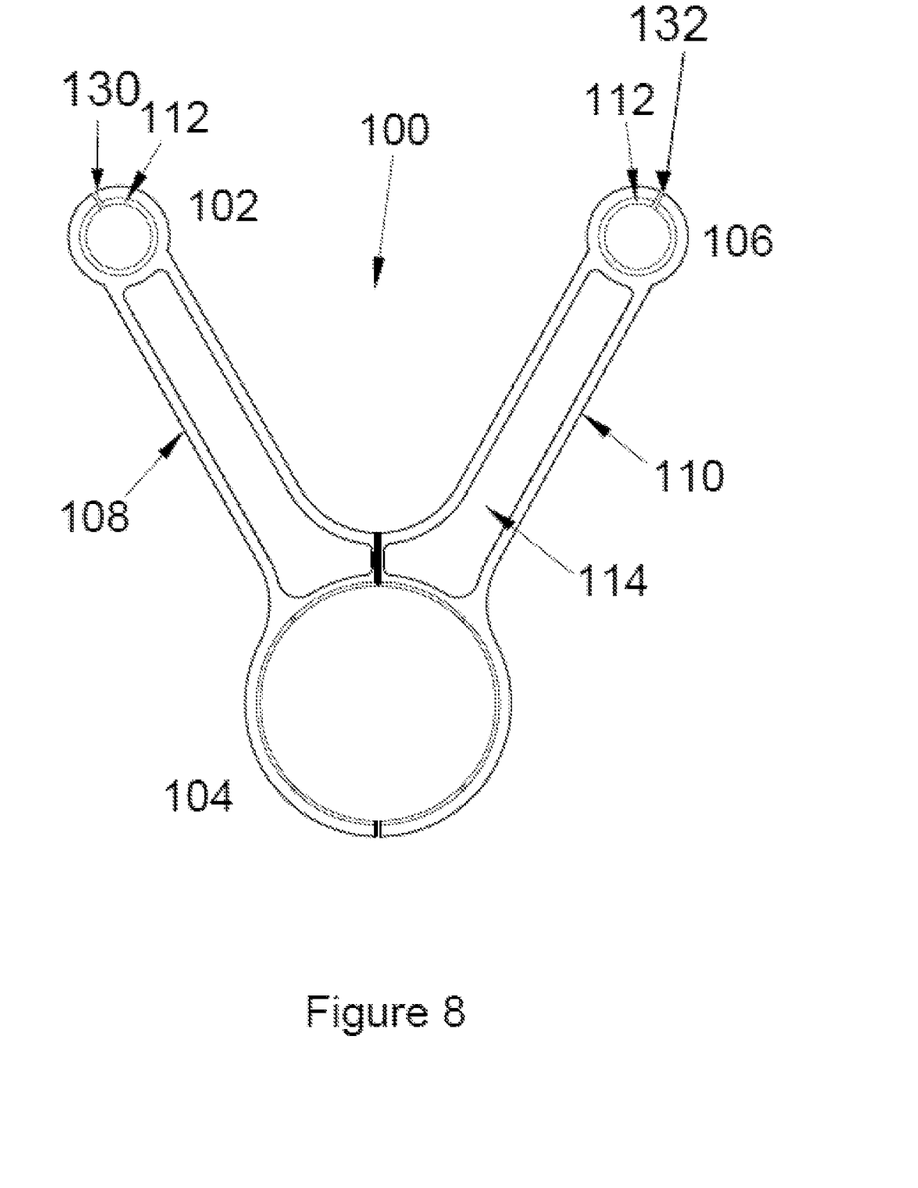
FIG. 8 is a front view of the supporting apparatus of FIG. 7.

Referring to FIGS. 7 and 8, the embodiment of pipe holder 100 is suitable for attaching to the hub of a drain pipe, rather than around the outside circumference of the drain pipe itself, and around a hot and a cold water supply pipe.

The V-shape orientation of the primary ring 104 and two secondary rings 102 and 106 in this embodiment is advantageous when used with the combination of a drain and hot and cold supply pipe, as used with a sink or shower hookup, as the piping for such hookups is frequently run in a V-shape, particularly where the water pipes passes through the drywall from behind the wall in the bathroom and then enter that room under the sink. At that point, it is advantageous to have a pipe holder that not only supports the three pipes used for these situations, but also positions the three pipes so that when they enter the bathroom through the drywall, they are advantageously positioned to be attached to a sink. Attaching this embodiment to the drain pipe hub also serves to exactly position the three pipes in relation to one another as they pass through the drywall.

The interior diameter of the primary ring 104 of this embodiment would therefore be preferably fabricated so as to fit over the outer diameter of a waste hub fitting. Preferably, the inner diameters of the primary ring 104 would range from 2" to 2.5", and more preferably be about 2.25". As well, the secondary rings 102 and 106 would be fabricated with interior diameters to preferably fit over the outer diameters of 0.5" water lines, as discussed earlier. Preferably this would result in inner diameters of these secondary rings 102 and 106 of between 0.6" to 0.8", and more preferably 0.669". In both cases, as previously stated, these diameters would be very slightly larger than the outer diameters of the piping to be surrounded by the rings.

The angle formed by the connection of each of the two secondary rings 102 and 106 to the first pipe holder ring 104 is approximately 50 to 70 degrees, preferably 55 to 65 degrees, more preferably 58 to 62 degrees, and most preferably it has been found that 60.95 degrees works well with the distances between centre lines and especially the most preferred distances.

In this embodiment, the vertical distance from the center point of primary ring 104 to the center point of each of secondary rings 102 and 106 is between approximately 2" and 3", and more preferably approximately 2.5" (63.5 mm). As well, the horizontal distance from the centre point of secondary ring 102 to the centre point of secondary ring 106 is preferably approximately 4" to 6" and more preferably approximately 5" or 127 mm. As well, the horizontal distance from the center point line of primary ring 104 to the center point of each of secondary rings 102 and 106 is approximately 4" to 6" and more preferably approximately 4.5" (114.3 mm).

Figure 9:
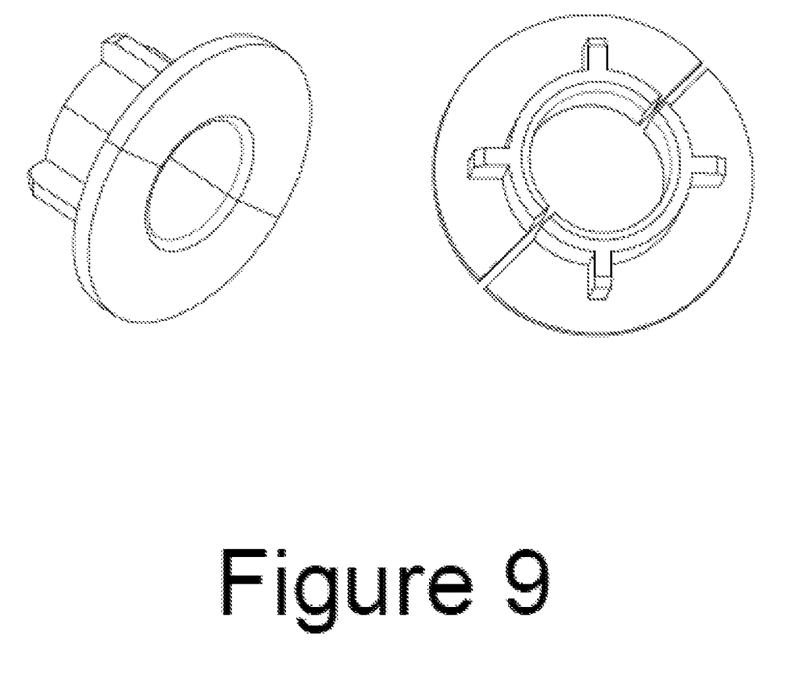
FIG. 9 displays two perspective views of an insert designed to be used in connection with an embodiment of the invention.
Figure 10:
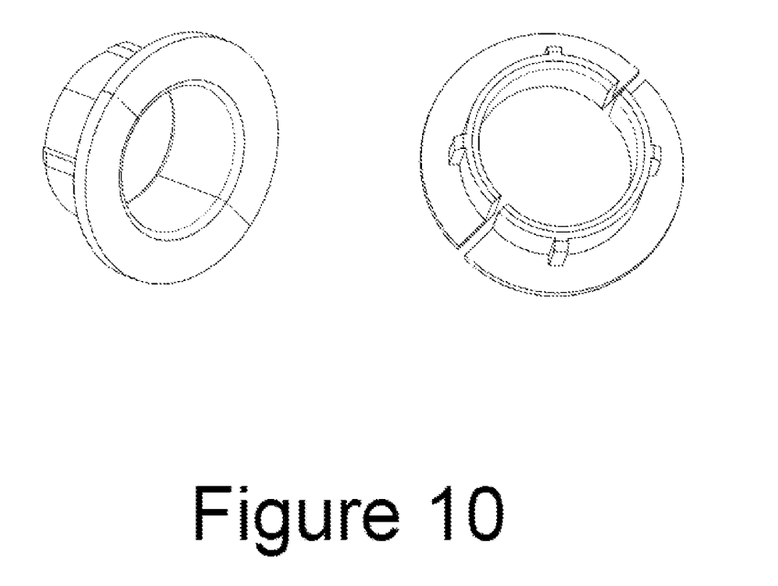
FIG. 10 displays two perspective views of a second size of insert from that shown in FIG. 9.

FIGS. 9 and 10 show two perspective views of an insert designed to be placed within the primary ring 104 or secondary rings 102 and 106 of any of the preceding embodiments of the present invention, as shown in FIGS. 1 through 8. Preferably, they would be used only within secondary rings 102 and 106 and not within primary ring 104, although doing the latter is possible. These inserts are designed with a diameter such that they can be inserted into the interior of the primary or secondary rings, to reduce their interior diameter so that a pipe holder 100 made for certain smaller diameter pipe can be used for such other diameter piping. This allows embodiments of the invention to be fabricated with rings designed to fit the largest standard pipe—1", for example—and yet be "stepped down" to fit other common sizes of pipe, such as 0.75" and 0.5" diameter pipe, for examples.

These inserts are preferably fabricated in two portions so that the pipe holder 100 with its primary ring 104 or secondary rings 102 or 106 is easily manipulated around the pipe to be fit to any of the rings in question. Once the pipe holder 100 is in a desired location, the inserts may then be placed around that pipe and into primary ring 104 or secondary rings 102 or 106, as needed. Fabrication of the insert in two pieces allows for it to be inserted after positioning the holder on a pipe already run through the building, rather than being placed around the pipe in question (or in the pipe holder 100) as the pipe is being run through the building.

As shown, FIG. 9 is an insert that reduces the interior diameter of the primary ring or secondary rings more than that shown in FIG. 10.

While the present invention and its advantages have been described in detail in connection with specific preferred embodiments the invention as claimed should not be unduly limited to such specific embodiments. It should be understood, and it would be apparent to a person of ordinary skill, that various changes, substitutions and alterations can be made to the invention and its modes of operation without departing from the scope and spirit of the invention including as defined by the appended claims and their essential elements.

Further, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufactures, compositions of matter, means, methods or steps, presenting existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Finally, the invention achieves multiple objectives and because the invention can be used in different applications for different purposes, not every embodiment falling within the scope of the attached claims will achieve every objective.

I claim:

1. A pipe holder comprising:
   (a) a rigid body, comprising:
      (i) a primary ring of a diameter adapted to fit around a first pipe, and
      (ii) one or more secondary rings integrated with the primary ring by one or more arms, each such secondary ring of a diameter adapted to fit around one of one or more secondary pipes;
   (b) an insert having a diameter adapted to fit around a third pipe, wherein the insert is configured to be inserted laterally into a selected secondary ring to reduce the diameter of the selected secondary ring to the diameter of the insert;
   wherein the primary ring and the one or more secondary rings lie in the same plane and are laterally disposed from one another; and
   wherein the fitting of the first pipe within the primary ring and the one or more secondary pipes within the one or more secondary rings, serves to stabilize, support, and position the first pipe and one or more secondary pipes relative to one another.

2. A pipe holder according to claim 1 wherein the pipe holder is fabricated from any one of metal, wood, polyoxymethylene, polyvinyl chloride PVC, chlorinated polyvinyl chloride CPVC, or acrylonitrile butadiene styrene (ABS).

3. A pipe holder according to claim 2 wherein the pipe holder is fabricated from acrylonitrile butadiene styrene (ABS).

4. A pipe holder according to claim 1 wherein n the one or more secondary rings each has an inner diameter of between 0.25" and 3.5" for engagement around a water supply pipe.

5. A pipe holder according to claim 4 wherein the one or more secondary rings each have an inner diameter of 0.5" to 1.3" for engagement around a water supply pipe.

6. A pipe holder according to claim 5 wherein the one or more secondary rings have an inner diameter of 1.14" to 1.16" for engagement around a water supply pipe.

7. A pipe holder according to claim 6 wherein the one or more secondary rings have an inner diameter of about 1.15" for engagement around a water supply pipe.

8. A pipe holder according to claim 5 wherein the one or more secondary rings have an inner diameter of about 0.65" for engagement around a water supply pipe.

9. A pipe holder according to claim 5 wherein the one or more secondary rings have an inner diameter of about 0.90" for engagement around a water supply pipe.

10. A pipe holder according to claim 9 wherein the primary ring has an inner diameter between 1" and 11".

11. A pipe holder according to claim 10 wherein the primary ring has an inner diameter between 1.85" and 4".

12. A pipe holder according to claim 11 wherein the primary ring has an inner diameter of 1.86" to 1.94".

13. A pipe holder according to claim 11 wherein the primary ring has an inner diameter of about 1.90".

14. A pipe holder according to claim 11 wherein the primary ring has an inner diameter of about 2.40".

15. A pipe holder according to claim 11 wherein the primary ring has an inner diameter of about 3.40".

16. A pipe holder according to claim 15 wherein there are two secondary rings.

17. A pipe holder according to claim 16 wherein the primary ring and the two secondary rings are disposed in a "V" shape with the two secondary rings disposed laterally outwards and upwards of the primary ring but in the same plane.

18. The pipe holder of claim 1, wherein the insert comprises two separable portions.

19. The pipe holder of claim 18, wherein the two separable portions are identical.

\* \* \* \* \*